G. C. RONQUEST.
AUTOMATIC NEST.
APPLICATION FILED MAY 8, 1916.

1,198,961.

Patented Sept. 19, 1916.
2 SHEETS—SHEET 1.

Witnesses

Inventor
G. C. Ronquest
By
Attorney

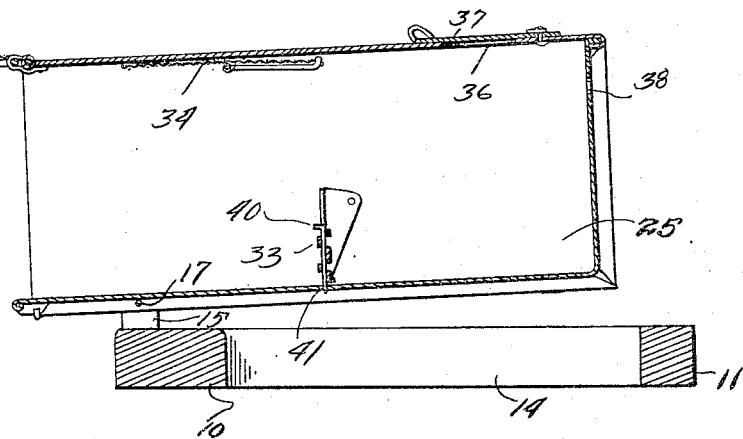
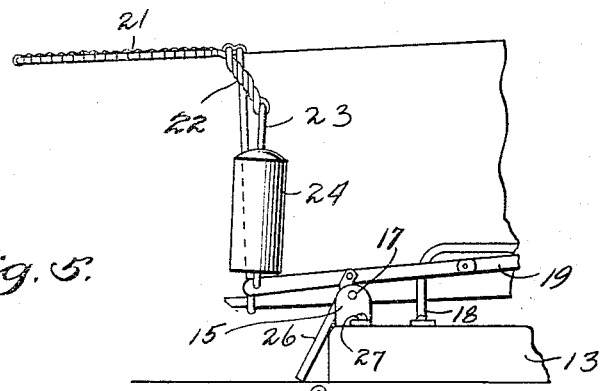
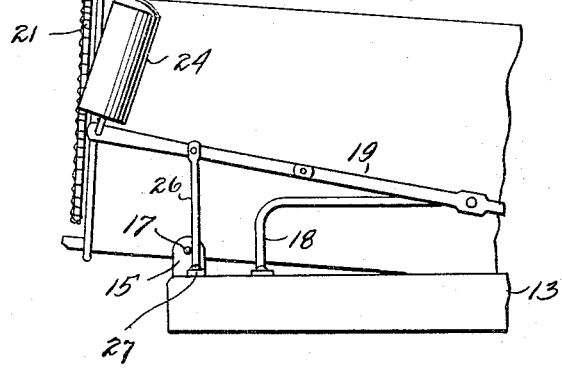

UNITED STATES PATENT OFFICE.

GEORGE C. RONQUEST, OF COLORADO SPRINGS, COLORADO.

AUTOMATIC NEST.

1,198,961.  Specification of Letters Patent.  Patented Sept. 19, 1916.

Application filed May 8, 1916. Serial No. 96,206.

*To all whom it may concern:*

Be it known that I, GEORGE C. RONQUEST, a citizen of the United States, residing at Colorado Springs, in the county of El Paso, State of Colorado, have invented certain new and useful Improvements in Automatic Nests; and I do hereby declare the following to be a full, clear, and exact description of the invention, such as will enable others skilled in the art to which it appertains to make and use the same.

This invention relates to improvements in nests, and particularly to automatic nests.

One object of the invention is to provide a nest which will automatically close when a hen enters, so as to prevent the possibility of another hen entering into the nest at the same time.

Another object is to provide a nest, which serves as a trap to prevent the escape of the hen after having entered the nest, and which is adapted to be released manually.

A further object is to provide novel means in connection with the trap nest to notify the owner when a hen is in the nest.

A still further object is to provide a nest so constructed that it can be used to confine a hen therein when sitting and thus prevent the hen leaving the nest or another hen entering at the same time.

Other objects and advantages will be apparent from the following description when taken in connection with the accompanying drawings.

Figure 1:
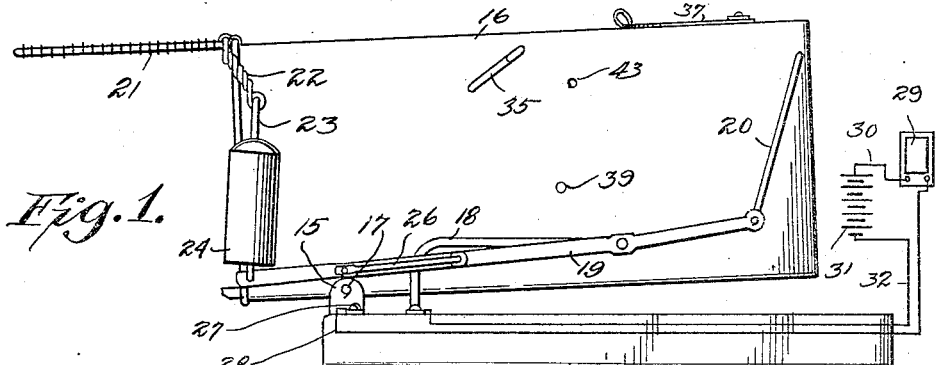
Figure 2:
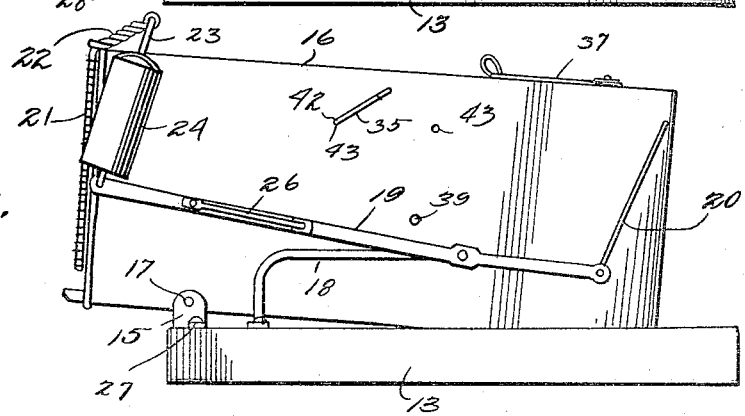
Figure 3:
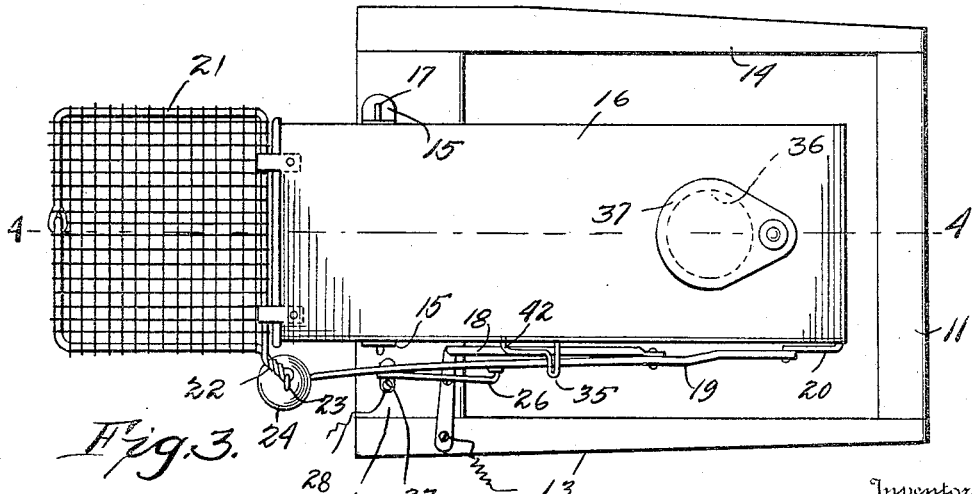

In the drawings: Figure 1 is a side elevation of my improved nest showing the position of the parts when in normal position, and used as an ordinary automatic nest; Fig. 2 is a side elevation showing the position of the parts when a hen has entered and is sitting on the nest; Fig. 3 is a top plan view: Fig. 4 is a longitudinal sectional view on the line 4—4 of Fig. 3; Fig. 5 is a side elevation of the device showing the position of the parts when in normal condition and when used as a trap nest; Fig. 6 is a side elevation showing the position of the parts when the trap nest has been tripped, and the hen confined therein.

Referring particularly to the accompanying drawing, 10 and 11 represent a pair of beams arranged in parallel relation and connected at their ends by the longitudinally extending parallel members 13 and 14. Mounted on the beam 10 are two spaced brackets 15, between which there is disposed the forward end of the nest housing or box 16, a pivot rod 17 being passed through the brackets and the box, below the bottom or floor thereof. The box is thus pivotally supported on the rod 17 so that its opposite end will be permitted to swing downwardly between the said members 13 and 14, and inwardly of the rear member 11. Secured on the beam 10 and extending upwardly and rearwardly along one side of the box is an arm 18, the end of which is pivotally connected to a longitudinally extending lever 19 intermediate the end thereof, said lever being disposed longitudinally at the side of the box. Pivotally supported on the side of the box, near the upper portion of the rear end is a downwardly extending arm 20 which has its lower end pivotally connected with the adjacent or rear end of the lever 19. Movably connected to the upper edge of the open or forward end of the box is a door 21, one end of the inner or connected edge of which is provided with an integral arm 22 pivotally connected with the forward end of the lever 19 through the medium of a vertical link 23. On this link is mounted a weight 24, the same being arranged to overbalance the rear end of the box by depressing the forward end of the lever 19, and at the same time swinging and holding the door 21 in normal open position by reason of its connection with the arm 22.

In normal position, the parts are as shown in Fig. 1. A hen enters the box, and as she passes into the rear end thereof, and steps into the nest receptacle 25, her weight will depress the rear end of the box, thus causing the rocking of the lever 19 and the closing of the door 21 through the medium of the link 23 and arm 22. As long as the hen stays in the rear of the box the door will be closed, and other hens prevented from entering the box. After the hen has laid an egg she leaves the nest receptacle and walks toward the entrance end, thus adding her weight to the weight 24 to restore the box into normal position and the opening of the door.

Pivotally mounted on the forward portion of the lever 19 is an arm 26, which when the nest is used as above described, is moved upwardly and held in such position, as clearly shown in Fig. 1, but when the nest is to be used for trapping purposes, this arm is swung downwardly and permitted to rest against the forward edge of the beam 10. Secured on the beam below the pivotal point of this arm 26 is a metal plate 27 to which is secured an electric wire 28. The other end of the wire extends to any suitable point, as for instance within the house, where it is connected with one of the binding screws of an electric signaling device, such as the buzzer 29. From the other side of the buzzer extends a wire 30 to a battery 31, while a wire 32 connects the other side of the battery with the attaching portion of the other arm 18.

When the hen enters the box, and passes to the rear end thereof so as to depress the box, the arm 26 will slide into a position above the plate 27 and rest thereon, thus completing the circuit through the battery and buzzer by means of the arm 18 and the lever 19. This arm when in engagement with the plate 27 acts as a prop to prevent downward movement of the forward end of the lever 19, and even though the hen should walk to the closed door, the box would not be rocked back into normal position. The buzzer would signal to the owner that a hen had been trapped, and by raising the arm 26 and tilting the box, the hen can be released. If it is desired to retain the hen in the nest, the following elements are brought into play: Secured to the sides of the box and extending transversely therewithin is a wall 33, and pivotally mounted in the upper portion of the box, above this wall is a downwardly swinging door 34, the pivotal mounting of which is provided with the handle 35 disposed downwardly of the side of the box by means of which the door can be swung into raised or lowered positions. In the top of the box, near the rear end is formed an opening 36 through which the eggs are extracted from the nest receptacle, said opening being controlled by a pivoted door 37. In the rear end of the box are formed openings 38 to provide ventilation.

The before-mentioned wall 33 is secured to the sides of the box at the points 39, so that said wall can be swung upwardly to permit the floor to be readily cleaned. A vertically slidable locking bolt 40 is carried by this wall and is adapted to engage in an opening 41 in the bottom of the box to lock the wall in upright position.

The handle 35 is provided with an inwardly extending projection 42 which is adapted to engage in one or the other of a pair of openings 43 in the side of the box to hold the door 34 in either elevated or lowered position.

What is claimed is:

1. An automatic nest comprising a base, a box pivotally supported on the base, a normally open swinging door at one end of the box, an arm mounted on the base and extending longitudinally at one side of the box, a lever pivotally connected intermediate its length to said arm, a link pivotally connected to the forward end of the lever and to the door, a link pivotally connected to the other end of the lever and other end of the box, and a weight carried by the first link for normally depressing the forward end of the lever to tilt the box forwardly and hold the door in open position.

2. An automatic nest comprising a base, a tiltable box mounted on the base, a normally open swinging door on one end of the box, means actuated by the tilting of the box in one direction for closing the door, a metal plate on the base, a pivoted prop carried by the door closing means and arranged to engage the plate to hold the box in tilted position and the door closed.

3. In an automatic nest, a tilting box having a nest in one end, a pivoted partition in the lower portion of the box and in front of the nest, means releasably holding the partition in normal position, and a pivoted barrier mounted above the partition.

In testimony whereof, I affix my signature, in the presence of two witnesses.

GEORGE C. RONQUEST.

Witnesses:
 ERNEST E. MOULTON,
 DANA E. WOOD.

Copies of this patent may be obtained for five cents each, by addressing the "Commissioner of Patents, Washington, D. C."